Patented Jan. 3, 1939

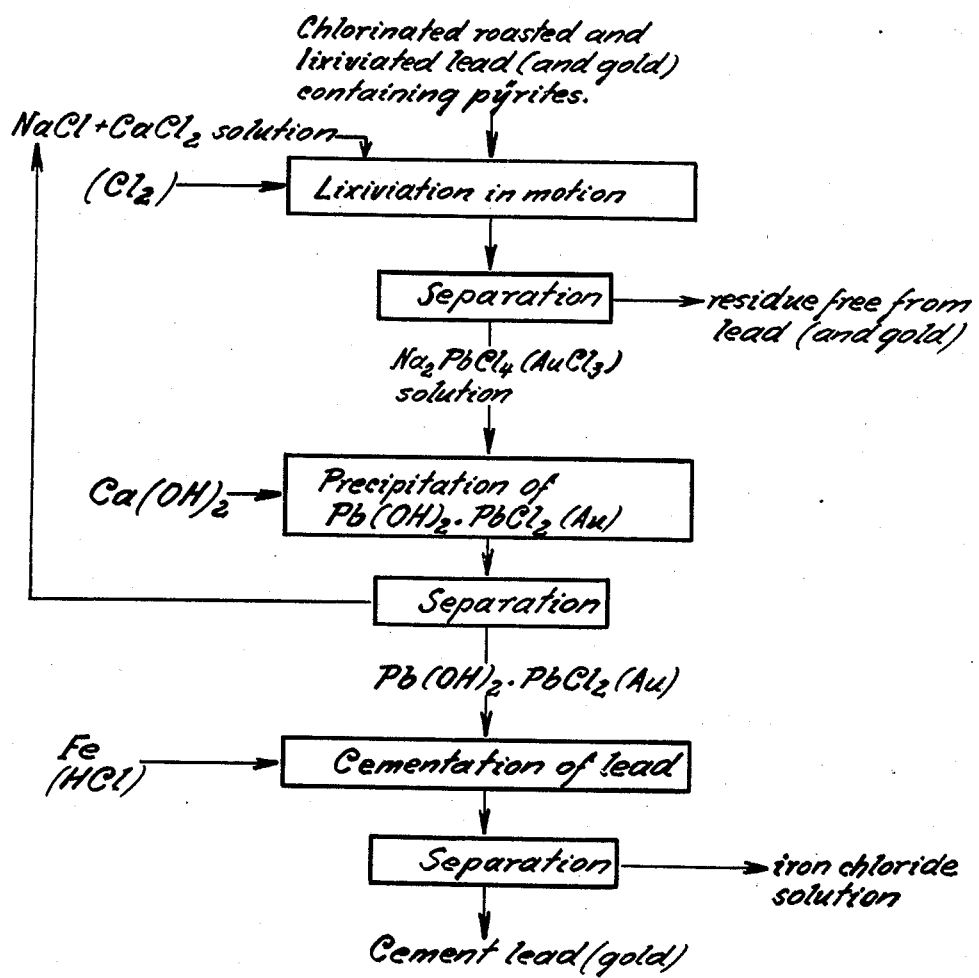

2,142,274

UNITED STATES PATENT OFFICE 2,142,274

MANUFACTURE OF LEAD FROM SUBSTANCES CONTAINING LEAD

Ernst Kuss, Duisburg, Germany, assignor of one-half to Duisburger Kupferhütte, Duisburg, Germany, and one-half to I. G. Farbenindustrie Aktiengesellschaft, Frankfort - on - the - Main, Germany Application February 18, 1937, Serial No. 126,523
In Germany February 22, 1936

2 Claims. (Cl. 75—120)

This invention relates to a process for the manufacture of lead from substances containing lead.

It is known that chlorinated roasted pyrites which are lixiviated for obtaining copper contain 0.9% of lead on the average. Though, for instance, in Germany about 1 million tons of pyrites are roasted per annum, which contain 10,000 tons of lead, this metal with the exception of small quantities, obtained in connection with the iron smelting, has been lost. Roasted pyrites with a higher lead content than 0.9% cannot be employed for smelting, so that millions of tons of roasted pyrites which are of some value because of their high content of noble metals are thrown away. In that case not only the lead but also the iron and the noble metals are lost.

In the literature experiments are disclosed according to which lead-containing ores after grinding and roasting are lixiviated with suitable solvents, the lead being separated from the lead-containing lyes obtained thereby by means of cementation and the lye recirculated in the cycle process. The said process for removing lead from roasted pyrites, however, cannot be employed in practice for the following reasons:—

At lixiviating temperatures of 60° C. when using solutions containing common salt only lead concentrations of 6–9 grams per liter of Pb are obtainable. Upon 1 ton of roasted pyrites at least 1 cbm. of lye would be used for lixiviating. That is to say, on working up 1000 and more tons of roasted pyrites per day 1000 cbm. and larger quantities of lyes must be cemented. Since the cementation process from these lyes proceeds only very slowly very large apparatus would be required for the cementation of the lead. Thus the process cannot be carried out on a commercial scale.

In accordance with the present invention the lead of roasted pyrites can be obtained on a commercial scale by treating the chlorinated roasted and lixiviated pyrites by lixiviating in motion with lead salt dissolving agents and precipitating the lead from the lyes containing lead obtained with lime as oxychloride and obtaining from the latter with scrap iron cement lead. By this working process the following advantages are achieved:—

1. The lye is regenerated in the precipitating process. The said process proceeds as follows:—
The lead lixiviating process is based on the equation $PbSO_4+2NaCl+CaCl_2=Na_2PbCl_4+CaSO_4$.

The precipitating process proceeds according to the following equation:

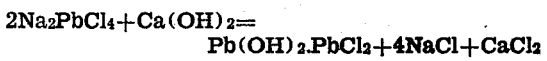
$2Na_2PbCl_4+Ca(OH)_2=$
$Pb(OH)_2.PbCl_2+4NaCl+CaCl_2$

That is to say a common salt-calcium chloride mixed lye is recovered for the process.

2. The lead is concentrated considerably in the oxychloride which contains about 55% of lead calculated upon dry substance; at this concentration it becomes possible to carry out the cementation on a commercial scale.

The accompanying drawing illustrates a flow diagram of the new process from which the sequence of the various steps and operation of the process can be readily followed in conjunction with the following detailed description of the process.

The pyrites are first subjected to chlorinating roasting in the usual manner and then lixiviated. Copper and zinc are practically completely dissolved, silver for the greater part, cobalt, manganese and other constituents to a high percentage. Practically undissolved, however, remain lead and any gold which is present.

Lixiviating with lead salt dissolving agents is advantageously carried out in rotating drums, preferably such drums as allow of a treatment of the pyrites with the lixiviating agent and washing out simultaneously. For lixiviating a sodium chloride-calcium chloride solution is used which preferably contains more than 150 grams of NaCl per liter and 10 to 20 grams of $CaCl_2$ per liter. The temperature is preferably above 50° C. As a lye also the separated sodium chloride-calcium chloride solution which is obtained as by-product in the working up of pyrites after precipitation with zinc may be employed. Precipitation of the oxychloride takes place advantageously without cooling of the solution so that only the loss of heat must be covered in the process.

The solutions are particularly advantageous if gold and lead are to be dissolved from the pyrites in one lixiviating stage. In such cases sodium chloride-calcium chloride solutions containing chlorine are used. As precipitating agents such bases are employed as yield difficultly soluble salts with sulfate ions. The precipitation of the oxychloride is carried out in a continuous working process and it is separated from the regenerated solution in a Dorr apparatus. For cementation the oxychloride is suspended in water. The suspension is rotated for several hours in the usual cementation drums with scrap iron, advantageously after acidification with hydrochloric acid. The separated and washed cement lead is melted in the known manner to lead and further worked up.

The invention is illustrated by the following examples without being restricted thereto:

*Example 1.*—100 tons of chlorinated roasted and lixiviated pyrites containing 0.9% of Pb are gradually introduced into a rotating drum into which a solution at 70° C. flows continuously in countercurrent, the solution containing 200 grams of common salt and 20 grams of calcium chloride per liter. Solution and pyrites are caused to flow after 5 minutes upon a plane filter, upon which the pyrites are free from adhering lead solution by filtering with suction and washing. From the solution containing lead, lead oxychloride is continuously precipitated with lime and the solution separated from the precipitation product in a Dorr apparatus. The precipitation product containing 700 kgs. of lead is suspended with 1 cbm. of water and pumped into a cementation drum containing scrap iron. For preventing the formation of basic salts 500 liters of 20% waste hydrochloric acid are added and the solution cemented for about 20 hours. The cement lead drawn off upon a suction filter is washed with dilute hydrochloric acid and water, dried and worked up to lead in the known manner.

*Example 2.*—Chlorinated roasted and lixiviated pyrites containing lead are continuously introduced into a lixiviating drum. In countercurrent to the pyrites transported by means of a conveying worm a sodium chloride-calcium chloride solution and gaseous chlorine and simultaneously also warm water for washing of the pyrites are introduced into the drum. The introduction of the chloride solution takes place about one quarter of the drum's length from the discharging end of the drum, while the warm water is directly introduced at the discharging end. The roasted pyrites leaving the drum after 10–15 minutes lixiviation are freed to the extent of more than 70% from gold and to about 90% from lead. The solution containing gold and lead salts is worked up as indicated in Example 1. The end product is obtained as lead containing gold from which gold is obtained in the known manner.

In a corresponding manner also other substances containing lead may be freed from lead.

I claim:—

1. Process for obtaining lead from chlorinated roasted and lixiviated lead-containing roasted pyrites, comprising lixiviating the chlorinated roasted pyrites with sodium chloride and calcium chloride-containing aqueous solutions in motion, precipitating from the lead-containing solutions obtained the lead by means of lime as lead oxychloride, using the solution obtained thereby in a cycle process for lixiviating the roasted pyrites, working up the lead oxychloride to cement lead and melting the cement lead in the usual manner.

2. Process for obtaining lead and gold from chlorinated roasted and lixiviated lead- and gold-containing roasted pyrites, comprising lixiviating the chlorinated roasted pyrites with sodium chloride and calcium chloride and chlorine-containing aqueous solutions in motion, precipitating from the lead- and gold-containing solutions obtained the lead by means of lime as lead oxychloride and the gold as metal, using the solution obtained thereby in a cycle process for lixiviating the roasted pyrites, working up the lead oxychloride containing the gold to cement lead, melting the cement lead and obtaining lead and gold therefrom in the usual manner.

ERNST KUSS.